United States Patent [19]

Sharp

[11] Patent Number: 4,457,333

[45] Date of Patent: Jul. 3, 1984

[54] CHECK VALVE WITH RELIEF-VALVE FEATURE

[75] Inventor: Donald L. Sharp, Conneaut, Ohio

[73] Assignee: Transamerica DeLaval Inc., Princeton, N.J.

[21] Appl. No.: 264,457

[22] Filed: May 18, 1981

[51] Int. Cl.³ .............................................. F16K 15/03
[52] U.S. Cl. .............................. 137/454.2; 137/512.1; 137/527; 251/337
[58] Field of Search .................. 137/512.1, 527, 454.2; 251/337

[56] References Cited

U.S. PATENT DOCUMENTS

| | | | |
|---|---|---|---|
| 2,827,921 | 3/1958 | Sherman | 137/527 |
| 2,927,182 | 3/1960 | Barkan | 137/527 X |
| 4,019,532 | 4/1977 | Schittek | 137/527 |
| 4,257,444 | 3/1981 | Ogle | 137/512.1 X |

FOREIGN PATENT DOCUMENTS 6336 of 1909 United Kingdom ................ 137/527

Primary Examiner—Robert G. Nilson
Attorney, Agent, or Firm—Hopgood, Calimafde, Kalil, Blaustein & Judlowe

[57] ABSTRACT

The invention contemplates a check-valve construction which exhibits substantially elevated resistance to onset of unidirectional flow (i.e., to valve opening), as compared with conventional constructions. This elevated resistance to valve-opening is achieved through use of a knuckle joint, connecting the valve member to the valve body and spring-urged to its most-spread condition when the valve member is in its closed position. The invention is shown and described in connection with a check valve having two valve members, each of which derives materially enhanced resistance to valve-opening displacement, through use of a separate spring-loaded knuckle joint associated with each of the respective valve members.

6 Claims, 4 Drawing Figures

CHECK VALVE WITH RELIEF-VALVE FEATURE

BACKGROUND OF THE INVENTION

The invention relates to a check-valve construction and will be described in the context of such a valve, particularly suited to accommodation of unidirectional liquid flow, although it is in principle also applicable to check valves for fluids other than liquid.

The conventional check valve, as for unidirectional accommodation of liquid fuel when filling wing tanks of an aircraft, has one or two valve members or petals, spring-loaded for closure to a corresponding one or two valve seats. Each valve member has a pivotally hinged connection to associated valve-body structure, at a location of downstream and transverse offset from the valve seat, and the spring-loading is about the pivot axis of the valve member, as by passing the hinge pin through the center of a coil spring, with one tangential end arm referenced to the valve body and another tangential end arm preloading the valve member to closed position.

In a refueling valve of the character indicated, it is desirable to have a firm bias against valve opening, in order to avoid accidental loss of fuel during varying conditions of pressure drop across the valve member, as in high-G flight maneuvers, or when balancing the aircraft by transfer of fuel from one full tank to a more depleted tank. The traditional way to achieve such bias is to provide a more stiffly compliant, preloading spring of the character indicated. But while such a spring can elevate the force threshold required to commence valve-opening action, the fact remains that more force is required, the more the valve member is to be moved in the further-opening direction. A stiff spring of the character indicated thus necessarily imposes relatively great resistance to flow, and impairs the ability to achieve a maximum valve opening.

BRIEF STATEMENT OF THE INVENTION

It is an object of the invention to provide an improved valve construction of the character indicated.

A specific object is to provide such a valve wherein, once the valve member is caused to commence a valve-opening displacement, the resistance to furtheropening displacement will reduce or, at least, will not increase to the degree inherent in prior valve configurations.

Another specific object is to provide a check valve with the substantial equivalent of relief-valve action, in the sense that once a valve-opening displacement occurs, the valve member will quickly move to full-open condition, for maximum reduction of pressure drop across the valve in the presence of a sufficient unidirectional liquid flow.

It is also a specific object to achieve the above objects with a valve construction having the inherent ability to develop a substantially elevated threshold resistance to commencement of valve-opening displacement, as compared to prior constructions.

A further specific object is to achieve the above objects with a construction in which the full-open condition of the valve develops a substantially reduced pressure drop across the valve for a given unidirectional flow rate, as compared to prior constructions.

A still further object is to achieve the foregoing objects with spring action that is significantly less stiffly compliant than has previously been considered necessary.

A general object is to meet the foregoing objectives with inherently simple structure which is easy to service and which is adaptable to a wide variety of body configurations and applications.

The invention achieves these objects and provides certain further features by employing a knuckle joint having pivotally connected arms which have separate pivotal connection with the valve member and with the valve body and which are spring-loaded to their mostspread relation when the valve member is in its closed position. In the valve-closed position, the arm-to-arm pivot of the knuckle joint is in approach to but short of intersection with a geometrical line between the point of knuckle-arm connection to the valve member and the point of knuckle-arm connection to the body. In the position of maximum valve opening, this arm-to-arm pivot is at maximum offset from the then-existing geometrical line between these knuckle-arm connections. The configuration makes use of (a) maximum mechanical disadvantage via the knuckle to provide relatively high resistance to initial valve-opening displacement and (b) maximum mechanical advantage via the knuckle to achieve and maintain the maximum valve-open position.

DETAILED DESCRIPTION

The invention will be illustratively described in detail for a preferred embodiment, in conjunction with the accompanying drawings, in which.

Figure 1:
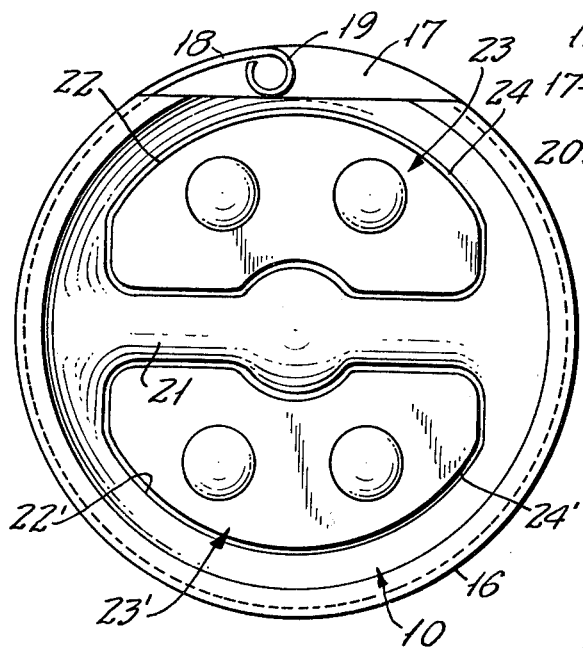
FIG. 1 is a front-end view of a check valve, i.e., the upstream end of the valve, for the valveclosed condition.
Figure 3:
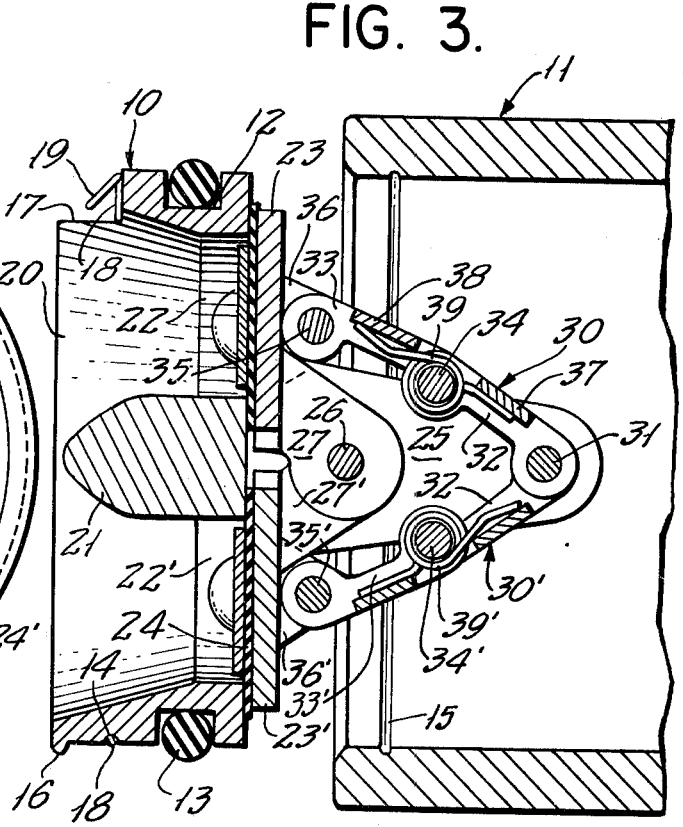
FIG. 3 is a longitudinal sectional view, taken at 3—3 of FIG. 2, to show the valve-closed relationship of parts.
Figure 2:
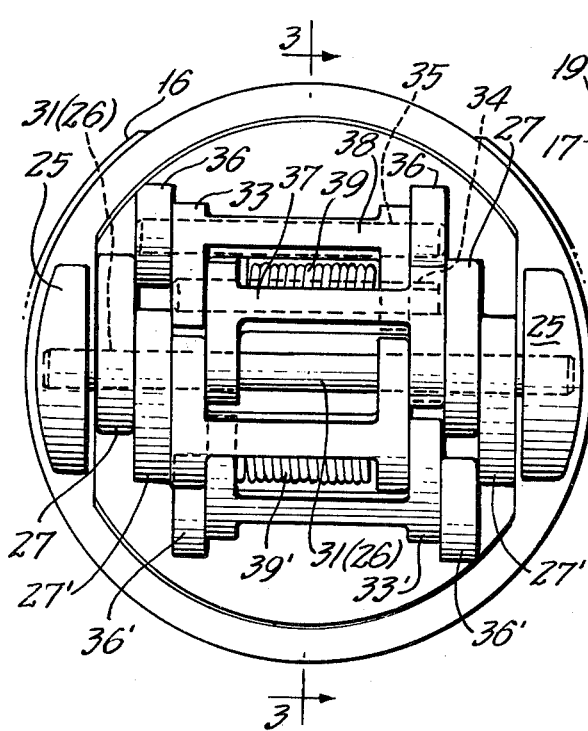
FIG. 2 is a rear-end view of the valve of FIG. 1, i.e., the downstream end of the valve.
Figure 4:
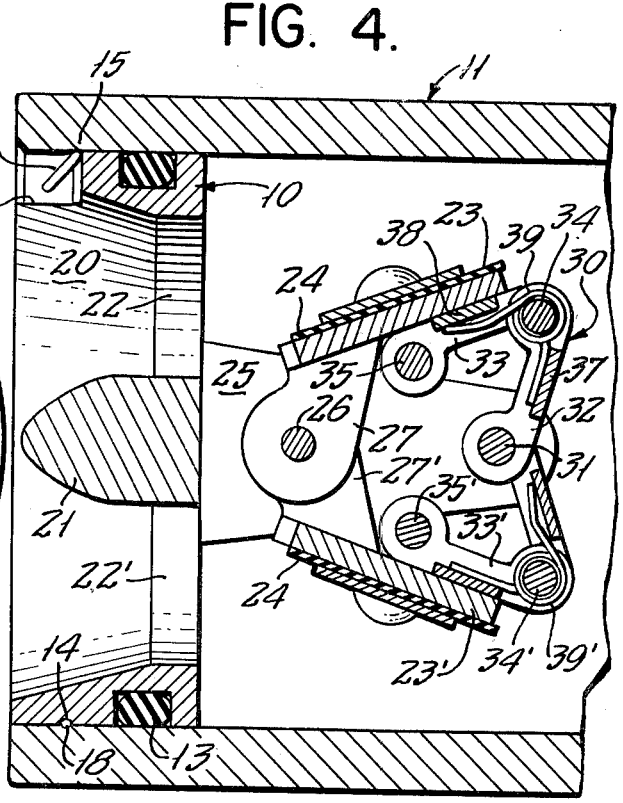
FIG. 4 is a view similar to FIG. 3, to show the valve-open relationship of parts.

The invention is shown in application to the cylindrically annular body 10 of an insert check valve of the variety lending itself to readily removable telescoping assembly to and within the bore of standard pipe or conduit, or a standard fitting therefor, an end fragment 11 of which is shown assembled to the valve body 10 (FIG. 4) and in the process of such assembly (FIG. 3). Such a structural relation is described in detail in co-pending Francis H. Ogle application Ser. No. 027,846, filed Apr. 6, 1979, now U.S. Pat. No. 4,257,444 to which reference is made for full discussion.

It suffices here merely to identify a first circumferential body groove 12 to retain an elastomeric O-ring 13 for sealing engagement to the bore of the tubular member 11, a second and smaller circumferential body groove 14 for axial register with a similar but inwardly open tubular-bore groove 15, and a radially outward body lip 16 to engage the outer end of the tubular bore and thus to identify the limit of telescopic assembly at which grooves 14-15 are in register. The lip (16) end of body 10 is locally recessed at 17 to an axial extent which includes the groove 14, and the angular limits of recess 17 are less than the remaining circumferential extent of the groove 14. When grooves 14-15 are in register, a stiffly compliant locking wire 18 is selectively manipulable, via an offset loop 19 at one end, into or out of such circumferentially extensive accommodation within the annular space defined by grooves 14-15 as to provide virtually circumferentially continuous distribution of retention force for the insert-valve assembly, via its body 10.

For the relationship shown, the body 10 provides a relatively large cylindrical through-passage 20 for unidirectional flow in the direction shown by legend, between an upstream end (at the left, in the sense of FIGS. 3 and 4) and a downstream end, fully contained within the bore of tubular member 11. A diametrically extending seat post 21 is an integral part of body 10 and divides passage 20 into two like, generally semicircular seat openings 22-22', against the downstream rims of which first and second valve members or petals 23-23' peripherally seal (via an elastomeric liner 24) when in valve-closed position (FIG. 3). Diametrically opposed downstream projections or pedestals 25 are integral formations of body 10 and establish end mountings for a diametrically extending hinge pin 26, to which hinge arms 27 (27') of valve members 23 (23') are both pivotally connected, it being noted that the pivot axis established by pin 26 is offset both downstream and transversely, with respect to the radial plane and to the eccentric offset of each seat perimeter; it is also noted that each valve member 23 (23') has two hinge arms 27 (27') at such spacing and offset as to place one hinge arm 27 (27') of each valve member into interlaced adjacency with one pedestal 25, while placing the other hinge arm 27 (27') into similar interlaced adjacency with the other pedestal 25.

Separate knuckle-joint subassemblies 30 (30') provide further interconnection of the valve-members 23 (23') with the body 10, and in the form shown the body reference for both subassemblies 30 (30') is provided by a second pivot pin 31 end-mounted to the spaced pedestals 25 and at a location of further downstream offset from pivot pin 26. Each knuckle-joint subassembly, such as subassembly 30 comprises two arms 32-33, having knuckle-end pin connection 34 to each other; the outer end of arm 32 has pivotal connection to the body-reference pin 31, while the outer end of arm 33 has pivotal connection at 35 to lugs 36 forming part of valve member 23. More specifically, each arm 32 integrally comprises two spaced side members with a connecting bridge 37, and each arm 33 integrally comprises two spaced side members with a connecting bridge 38. The side members of the respective arms 32-33 are in nested interlace, and a coil spring 39 is located on knuckle pin 34 in the space between adjacent corresponding side members of the arms 32-33; the tangentially extending ends of spring 39 are in preloaded engagement with bridges 37-38, in the sense urging arms 32-33 to their most-spread relation (FIG. 3).

All pivot pins 26-31-34-35 are parallel to each other, and in the most-spread relation of arms 32-33, the axis of knuckle pin 34 is in approach to but short of intersection with a geometrical line or plane between the outerend pin axes at 31-35. In the full-open condition of valve member 23, the angular spread between kunckle arms 32-33 is reduced to a minimum (thereby increasing the spring load on arms 32-33), and knuckle pin 34 is at maximum offset from the thenexisting geometrical line or plane between the outerend pin axes at 31-35.

Parts described for the knuckle-joint subassembly 30 apply equally for the knuckle-joint subassembly 30', and they are given the same reference numbers, with primed notation to avoid confusion.

In its valve-closed condition, the described construction will be seen to establish almost (but not quite) a straight-line or single-plane relation between pivot axes 31-34-33 of a given knuckle-joint subassembly 30. This relation, in the context of a given preload spring 39, will present relatively great mechanical disadvantage to any pressure applied on the upstream side of the applicable valve member 23, meaning that a relatively high threshold force must be developed before the valve member 23 can begin to move from its closed position. However, once this threshold force is attained and any valve-opening displacement occurs, there is an immediate increase in the offset of knuckle pin 34 from the then-existing geometric line or plane between axes of pins 31 and 35, accompanied by a marked decrease in the indicated mechanical disadvantage. In fact, the mechanical disadvantage decreases so rapidly with incremental advance in the opening displacement of the valve member that the valve member virtually snaps to its full-open condition (FIG. 4) soon after valve-opening displacement commences. Once fully open, the mechanical disadvantage has been replaced by mechanical advantage, so that relatively little knuckle-compressing force is required from the unidirectional fluid flow in order to maintain the full-open condition. And in view of the relatively small force needed to hold the full-open condition, the drag or resistance to flow through the valve is at a minimum. Of course, what has been said for valve member 23 and its knuckle system 30 applies equally and concurrently for valve member 23' and its knuckle system 30'. And when flow terminates, even relatively softly compliant springs 39 (39') are sufficient to restore the fully closed condition of both valve members.

It will be seen that the described valve system meets all stated objectives with a check valve that acts virtually like a relief valve, in that once the predetermined opening threshold is reached, the valve pops into its full-open position. The extent of mechanical disadvantage at valve-closed position can be built into any given design, by specification of the minimum offset of axis 34 from the line joining axes 31-35 for the valve-closed position, and a further dimension of control is obtained through suitable choice of the relatively weak spring 39 and its preloading condition. For purposes of comparison, it can be stated that for a given size valve body with two hinged valve members, the threshold pressure to open the described valve can be in the order of 10 psi with a weak spring 39, while a conventional valve of the same size and equipped with a relatively stiff spring on the hinge pin 26 provides a maximum valve-opening threshold pressure of only 2 psi. And, as noted above, the conventional valve, once opened, necessarily offers substantially greater resistance to fluid flow and requires much greater force to maintain the full-open condition.

While the invention has been described in detail for a preferred form, it will be appreciated that modifications may be made without departure from the claimed scope of the invention. It will also be appreciated that the described valve structure has uses other than the fueling application mentioned above. For example, in view of its relatively high threshold for determination of initial valve opening (followed by fast transition to full-open condition), the valve of the invention offers a simple and less expensive substitution for the more familiar poppet-valve version of a relief valve. More specifically, the indicated high threshold qualifies the described valve to perform safety-relief venting of pressure to protect a fluid system, or for the quick and efficient drainage of fuel from aircraft prior to hangar storage.

It will be understood that although the two arms 32-33 (32'-33') of each knuckle-arm linkage 30 (30') have been described as spring-loaded in their spreading direction (in the context of spring 39 being mounted on knuckle pin 34, with loading-arm contact on both arms), such descriptive language is also applicable to other spring-loading arrangements, such as a single coil spring carried by pin 31, with loading-arm contact at one end with bridge 37 of arm 32 and at the other end with bridge 37' of arm 32'.

What is claimed is:

1. In a check valve, a generally cylindrically annular valve body having a through-passage between an upstream end and a downstream end, a seat region in substantially a radial plane with respect to the axis of said passage, said body including a seat post extending across said passage at said radial plane and establishing two seat regions on opposite sides of said seat post, separate movable valve members each of which is configurated on its upstream or seat-engageable side for peripherally continuous closing relation with one of said seats in one position, the downstream side of each said valve member having a hinge-arm formation for valve-member articulation about a hinge axis offset both downstream and laterally with respect to the seat-engageable side of said valve member, means including a single body-mounted hinge pin pivotally mounting said valve members on a common hinge axis, said hinge pin extending diametrically of said body and being located downstream from said seat region, first and second knuckles each of which comprises two link arms pivotally connected at their inner ends, the outer end of one link arm of each knuckle being pivotally connected to said body at a location downstream from said hinge pin, the outer end of the other link arm of each knuckle being pivotally connected to the downstream side of one of said valve members at a location that is offset from the valve-member hinge axis, the distance between outer-end pivot connections of said link arms when in valve-closing position being less than the combined pivot-to-pivot distances of said link arms, and spring means reacting between said link arms of the respective knuckles about their inner-end pivot connection and urging said link arms in the direction of their respective valve-closing positional relations, the body connection of said knuckles being on a single axis that is parallel to the hinge axis of the respective valve members.

2. In a check valve as an article of manufacture, comprising a cylindrically annular body which includes a diametrically extending seat post dividing the opening of said body into two like opposed generally semicircular valve seat openings to share fluid flow in a single downstream direction through said body, and two valve members hinged to said body to open and close said openings, the improvement wherein each of said valve members is urged to closed position via knuckle-joint arms which are spring-loaded in their spreading direction, each valve member being pivotally connected to one outer knuckle-joint arm end and said body having pivotal connection to the other outer knuckle-joint arm end, each of said valve members being seated at its valve-seat opening when the associated knuckle-joint arms are in their most-spread relation, and said other outer arm ends sharing a common pivot-axis connection to said body.

3. A check valve, comprising a cylindrically annular body including a diametrically extending seat post dividing the opening of said body into two like opposed generally semicircular valve-seat openings to share fluid flow in a single downstream direction through said body, first and second diametrically extending pins carried by said body at different downstream offsets from and parallel to said seat post, a separate valve member for independent opening and closing of each valve-seat opening and hinged to the pin at nearer offset from said seat post, and a separate knuckle joint associated with each valve member, each said knuckle joint comprising two pivotally connected arms which are spring-loaded in their arm-spreading direction, each valve member being pivotally connected to one outer end of its associated knuckle joint and said body having pivotal connection to the other outer end of said associated knuckle joint via the other of said pins, and each of said valve members being seated at its valve-seat opening when the associated knuckle-joint arms are in their most-spread relation.

4. The check valve of claim 3, in which the external surface of said body is a cylinder having a cirumferential radially outwardly open seal-ring groove near one axial end, a radially outward lip formation near the other end, and a radially outwardly open retaining-ring groove between said seal-ring groove and said lip formation.

5. The check valve of claim 4, in which the other axial end of said body is locally recessed to an axial extent which includes said retaining-ring groove but which is axially short of intercepting said seal-ring groove, the angular limits of said recess being less than the remaining circumferential extent of said retaining-ring groove.

6. The check valve of claim 3, wherein for said most-spread relation of each knuckle joint the pivot connection of said arms to each other is in approach to but short of intersection with a geometric line between the valve-member connection and the body connection.

* * * * *